(12) United States Patent
Lomax

(10) Patent No.: US 12,195,079 B2
(45) Date of Patent: Jan. 14, 2025

(54) VEHICLE

(71) Applicant: Aqualand Industries Limited, Wakefield (GB)

(72) Inventor: Stuart Lomax, Wakefield (GB)

(73) Assignee: Aqualand Industries Limited, Wakefield (GB)

( * ) Notice: Subject to any disclaimer, the term of this patent is extended or adjusted under 35 U.S.C. 154(b) by 1023 days.

(21) Appl. No.: 17/250,445

(22) PCT Filed: Jul. 25, 2019

(86) PCT No.: PCT/GB2019/052082
§ 371 (c)(1),
(2) Date: Jan. 22, 2021

(87) PCT Pub. No.: WO2020/021265
PCT Pub. Date: Jan. 30, 2020

(65) Prior Publication Data
US 2021/0403086 A1 Dec. 30, 2021

(30) Foreign Application Priority Data
Jul. 25, 2018 (GB) ..................................... 1812121

(51) Int. Cl.
*B62D 11/04* (2006.01)
*A63G 25/00* (2006.01)
(Continued)

(52) U.S. Cl.
CPC .............. *B62D 11/04* (2013.01); *A63G 25/00* (2013.01); *B60W 30/08* (2013.01); *B62D 1/12* (2013.01); *B62D 31/00* (2013.01); *B62D 61/10* (2013.01)

(58) Field of Classification Search
CPC ........ B62D 111/04; B62D 1/12; B62D 61/10; B62D 31/00; B60W 30/08; A63G 25/00
See application file for complete search history.

(56) References Cited

U.S. PATENT DOCUMENTS 3,799,362 A 3/1974 Oswald et al.
5,842,532 A 12/1998 Fox et al.
(Continued)

OTHER PUBLICATIONS

Aqualand Industries Limited, in connection with PCT/GB2019/052082 filed Jul. 25, 2019, "International Search Report", 6 pages, mailed Feb. 1, 2020.

*Primary Examiner* — Tony H Winner
(74) *Attorney, Agent, or Firm* — McKee, Voorhees & Sease, PLC

(57) ABSTRACT

A vehicle (2) is provided for use for movement across a surface (18). The vehicle (2) includes a body (4), steering means to allow the selective steering of the vehicle (2) via first and second sets of a plurality of drive wheels (11, 12), a first set (11) mounted on one side (14) of the body (4) and a second set (12) mounted on the opposing side (16) of the body (4) so as to contact with the surface (18). At least one wheel in each set (11; 12) is provided so as to be in greater traction and/or grip with the said surface (18) than the other wheels (11; 12) in the set (12) to thereby achieve an improved steering system which requires low power consumption to achieve the steering and thereby reduce the power demand on the batteries of the vehicle (2) which are provided to drive the vehicle (2) and prolong the time of usage of the vehicle (2) between battery charging being required.

21 Claims, 11 Drawing Sheets

Figure 1A:
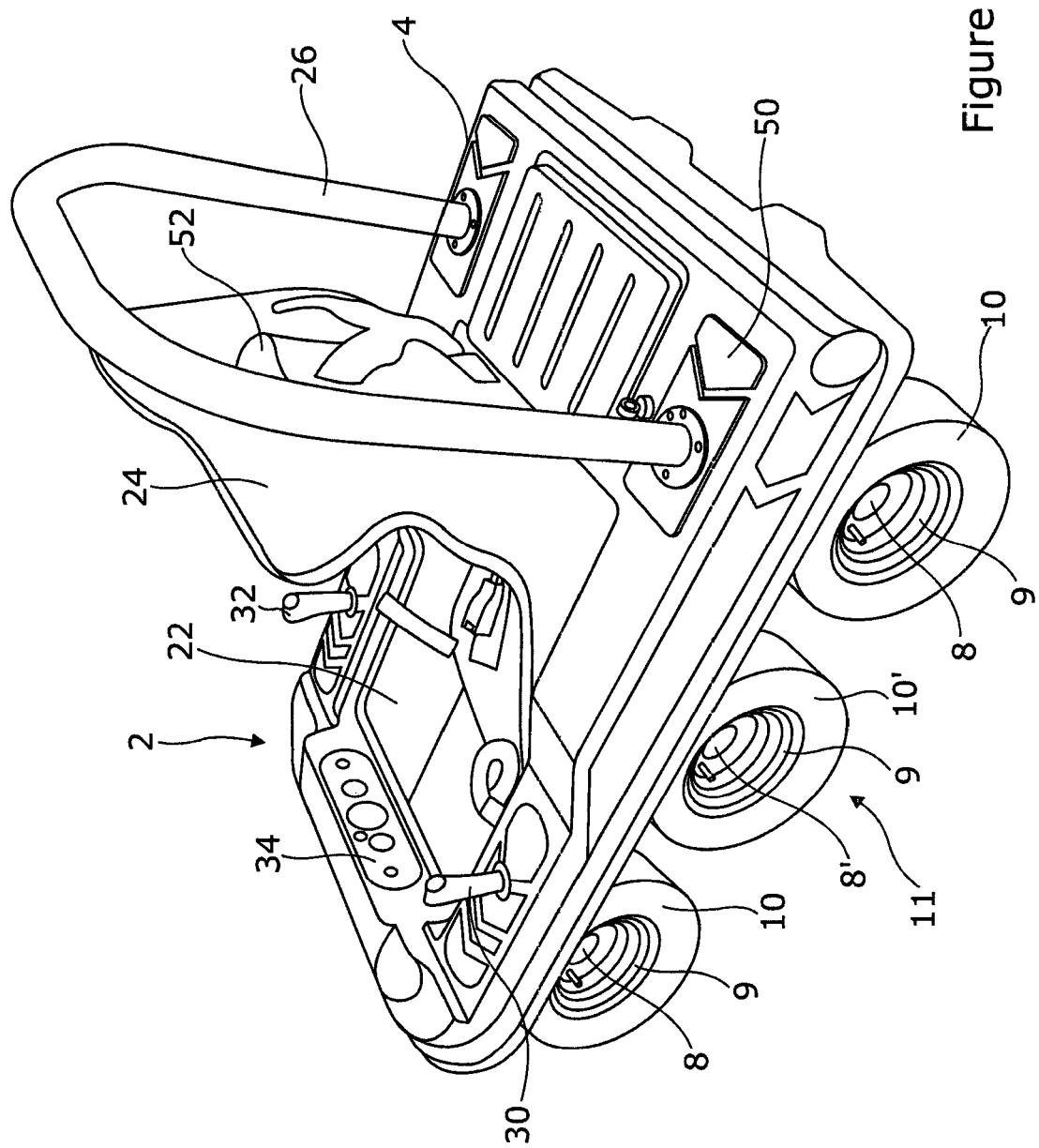
Figure 1B:
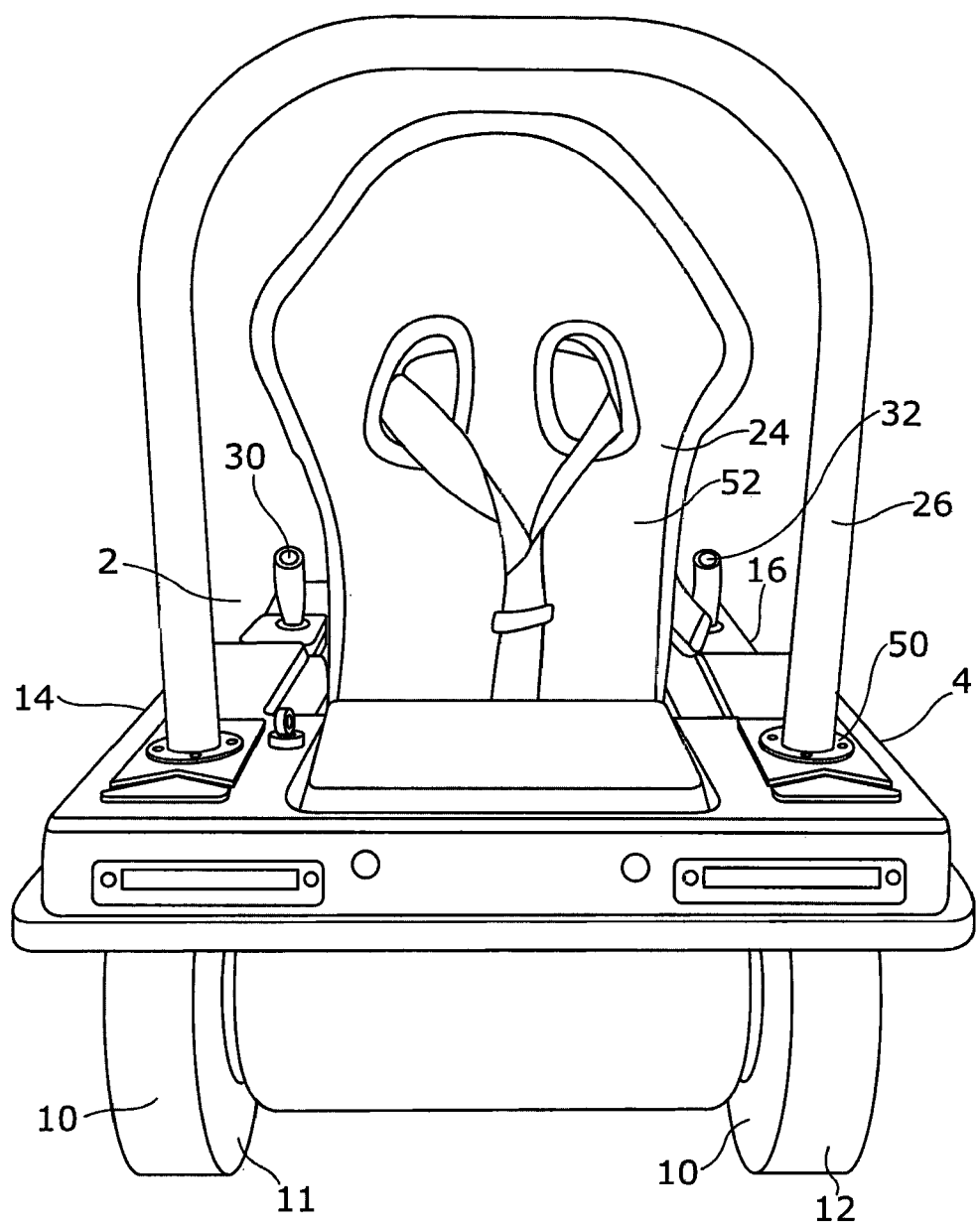
Figure 1D:
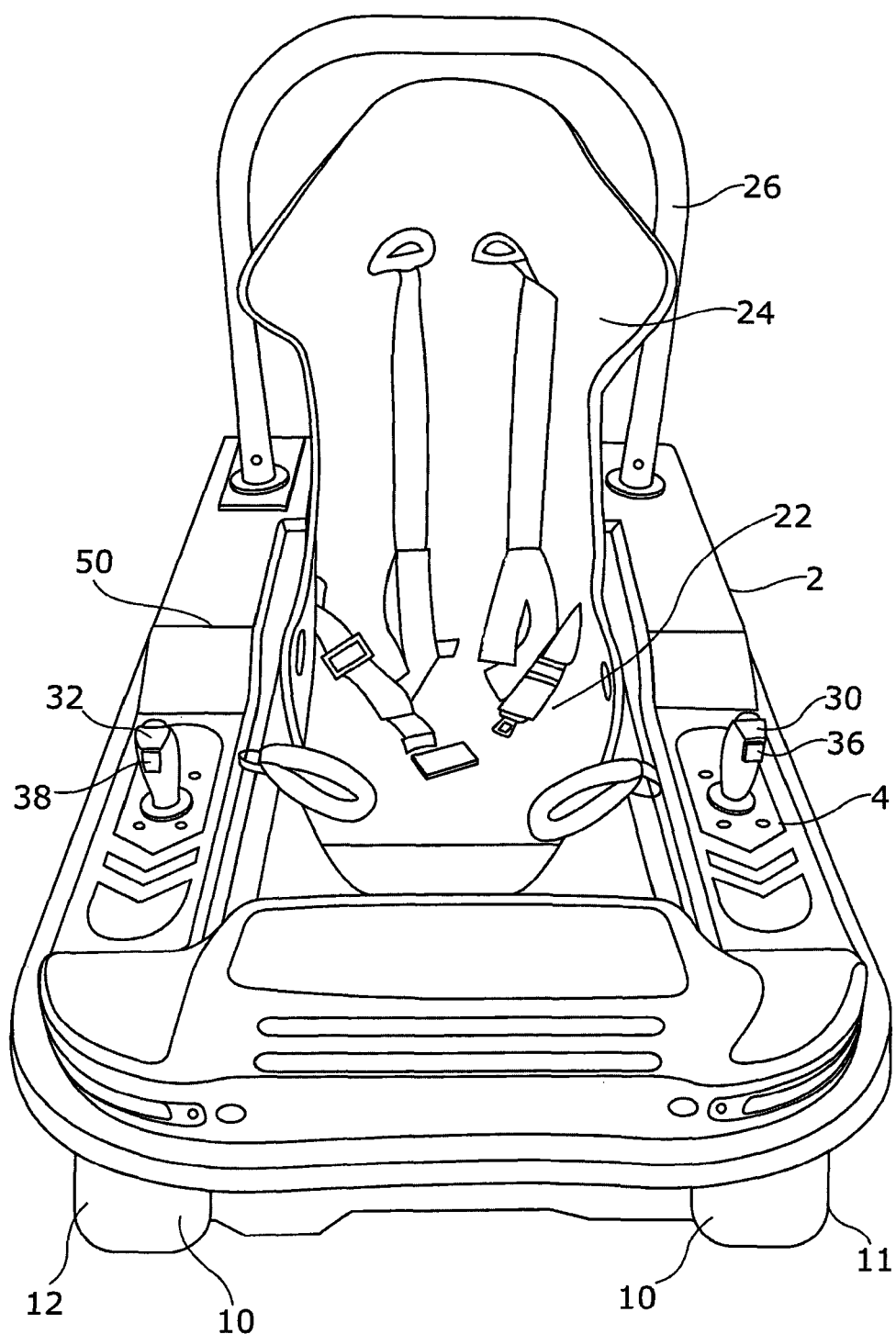

(51) Int. Cl.
- *B60W 30/08* (2012.01)
- *B62D 1/12* (2006.01)
- *B62D 31/00* (2006.01)
- *B62D 61/10* (2006.01)

(56) References Cited

U.S. PATENT DOCUMENTS

| | | | |
|---|---|---|---|
| 11,124,233 B1* | 9/2021 | Kurczewski | B60G 17/0162 |
| 2004/0163863 A1* | 8/2004 | Beck | B64G 1/16 |
| | | | 180/65.51 |
| 2012/0185129 A1* | 7/2012 | Carrier | F41H 7/048 |
| | | | 180/24.07 |
| 2020/0010104 A1* | 1/2020 | Desberg | B62B 7/042 |
| 2020/0363329 A1* | 11/2020 | Okumura | G02B 5/26 |
| 2021/0101433 A1* | 4/2021 | Liivik | B60G 17/019 |
| 2022/0266933 A1* | 8/2022 | Kim | B62D 57/028 |
| 2023/0322038 A1* | 10/2023 | Zavadsky | B60G 7/02 |
| | | | 280/5.514 |

* cited by examiner

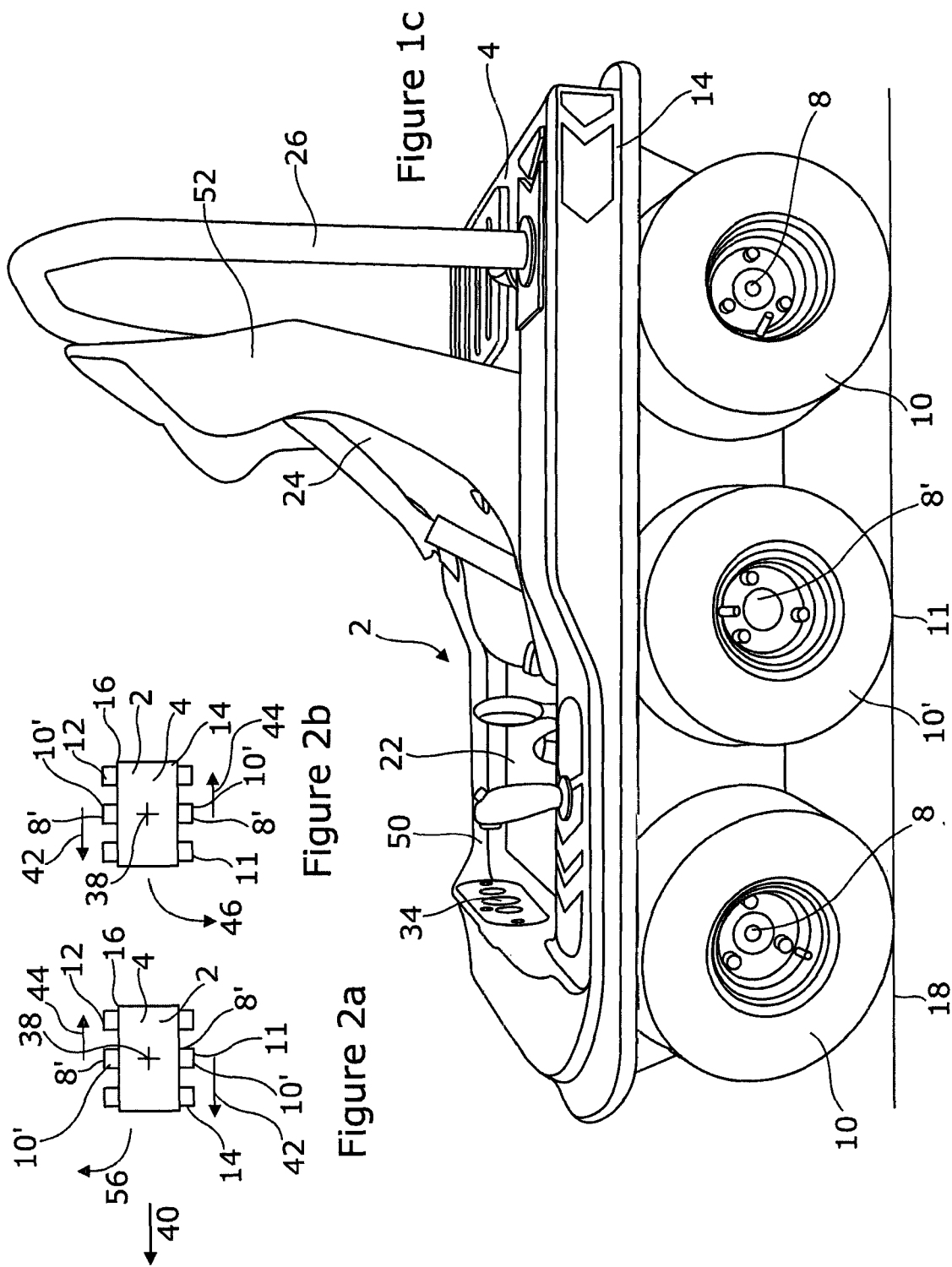

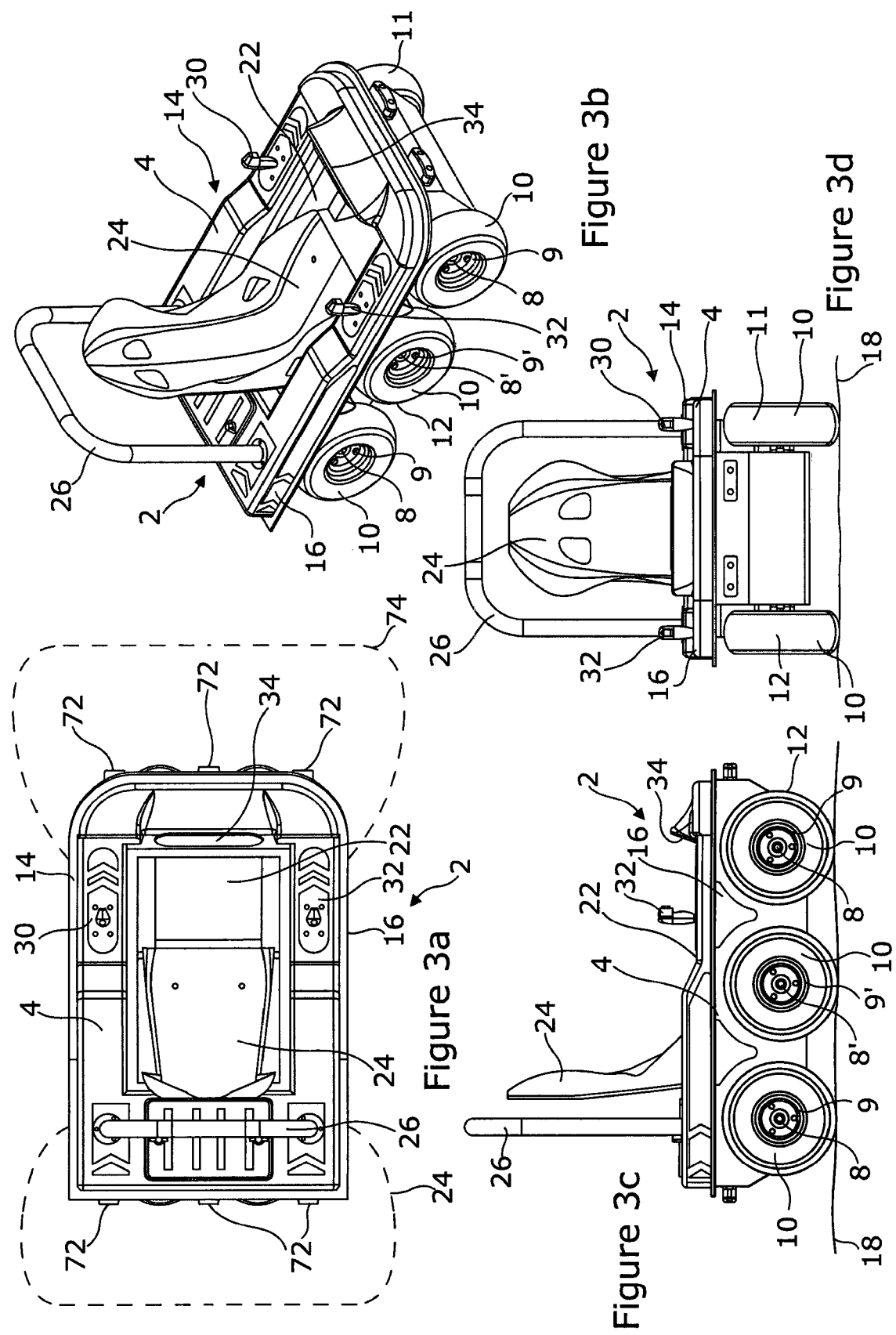

VEHICLE

The invention to which this application relates is a vehicle of a type which is provided to be driven across different terrains and different slopes so as to allow the same to effectively be deemed to be an all terrain vehicle. In particular, although not exclusively, the vehicle is provided in a form to allow the same to be used in a designated area and to be capable of being operated by a child or youth who may be under the normal permissible age for driving.

The provision of vehicles which can be operated by young persons is known but the vehicles either tend to be provided in the form of go-karts which are relatively high powered and are provided to be used in race situations along a track and to be driven by young people who have a skill and aptitude in order to be able to control the vehicle and race the same or, at the other end of the spectrum, the vehicles tend to be very low powered and designed to be operated by younger children which means that their possible usage is very limited and which can lead to the use of the vehicle becoming less frequent as the child becomes bored with the same. Furthermore, in either form, the terrain on which the vehicle can be used is also limited and, in the terms of go-karts, vehicles can be relatively expensive to operate and maintain such that the availability of the same for children is limited.

In the provision of all-terrain vehicles or at least vehicles which are capable of being operated on relatively rough terrain and/or slopes, the vehicles which are currently available tend to be almost bespoke in design and, as a result, and due to the relatively small volumes of vehicles of this type which are sold, the vehicles tend to be expensive such that the same are most typically used for professional purposes such as on estates, parkland and the like.

Furthermore, the complexity of the operating systems for these vehicles in order to allow them to be genuinely all terrain vehicles means that the same are expensive to operate and maintain in a working condition.

A further problem which has acted as a hindrance to the use of vehicles of this type by, for example, children, is the ability to provide power for the operation of the vehicle in a safe manner. Petrol or diesel engines can be to powerful for the relatively small versions of this type of vehicle, whilst the provision of battery power has conventionally not been possible due to the relatively high power requirements to operate vehicles of this type in difficult terrains and also with respect to the steering of the same. This has meant that the power consumption has made the usable life of a charged set of batteries to be too short for practical use of the vehicle or require so many batteries to be provided on the vehicle so as to adversely affect the weight of the vehicle.

An aim of the present invention is to provide a vehicle which has an extended capability in terms of usage on different terrains and for different purposes but to provide a vehicle in a format which is still capable of being operated by a young person and, furthermore, can be provided in a form which allows the same to be transportable and made available for use at different locations for a rental price. A further aim is to provide a vehicle in the form which allows the same to operate under electrical power and to be operable under that electrical power for an extended and practically useful period of time, thereby rendering the use of vehicles of this type with electrical power to be practically and commercially viable.

In a first aspect of the invention, there is provided a vehicle for use for movement across a surface, said vehicle including a body, steering means to allow the selective steering of the vehicle and first and second sets of a plurality of drive wheels, a first set mounted on one side of the body and a second set mounted on the opposing side of the body so as to contact with the surface and wherein at least one wheel in each set is provided so as to be in greater traction and/or grip with the said surface than the other wheels in the set.

Typically the said axis of rotation of said wheel with greater contact with the surface in each set is offset from the axis of rotation of the other wheels in the set so as to be closer to the surface.

Typically the greater contact with the surface provides increased traction and/or grip on the surface than the other wheels in the set.

In one embodiment the offset can be measured with respect to the respective axles of rotation such that the offset wheel axle is offset so as to be closer to the support surface than the axles of the remaining wheels in the set and in one embodiment the offset distance is in the region of 8-25 mm.

In one embodiment, the set of wheels each include three wheels and the wheel which has the axle which is offset is the central wheel of the three wheels.

Typically, the tyres which are provided on the wheels are all inflated to a pressure which is in a predetermined range so as to ensure that during use of the vehicle, the wheels will all normally be in contact with the surface but the wheel which has the greater contact may be inflated to a higher pressure than the other wheels in the set so as to achieve the greater contact, possibly without the need to offset the axis of rotation of the wheels from the axes of rotation of the other wheels in the said set. In which ever embodiment the wheel with the greater contact has a greater surface area and/or grip force on the surface than the other wheels. It is found that in practice, this enables the turning of the vehicle to the right or left under steering control, to be achieved whilst reducing the amount of force which is required to be generated by the vehicle in order to allow the turn to be achieved.

In one embodiment, the vehicle is electrically powered and so the reduction in force which is required for turning, means that the usage of electrical power necessary to achieve the steering is reduced and hence the life of operation of the vehicle under a single charge of the batteries, is extended significantly.

In one embodiment, the steering to the right or left, is achieved by operating a first set of the wheels to move in a forward direction and the operation of a second set of wheels at a reduced speed in the first direction or in the reverse direction so that the axis of rotation of the vehicle during the steering movement is effectively about the location of the central wheel in one of the sets of wheels depending upon the direction of steering which is required.

Typically, during the steering operation, a movement force is applied to all of the wheels in each set maintaining drive on uneven terrain. Thus, a powered steering system is provided rather than a skid steering system.

In one embodiment, the steering is achieved by the user control of steering means in the form of first and second joysticks, a first joystick operable to control the movement of the first set of wheels and the second joystick operable to allow the operation of the second set of wheels.

In one embodiment, the vehicle is provided with a safety Deadman switch system and preferably, the system is operable in conjunction with the joysticks, with each joystick having a switch which is required to be operable by the user in order to allow control to be achieved and preferably, both switches on the respective joysticks are required to be operated simultaneously for operation of the powered movement of the vehicle and, if the switches are then inoperable the power supply is stopped to the vehicle.

Typically all of the wheels provide a drive force thereby providing, in one embodiment, a 6 wheel drive vehicle. It is found that this enables full control of operation of the vehicle on any surface and that the vehicle has sufficient power to manoeuvre under all conditions.

In one embodiment, the drive to a set of wheels is provided via a chain which is located with respective sprocket wheels on each of the wheels in the set.

In one embodiment, and in order to allow the control of the chain with respect to the sprockets, each of the sprockets are provided with guide means in the form of plates mounted on either side of the same so as to restrict movement of the chain to either side of the sprocket.

In one embodiment, the vehicle is a single seated vehicle and the cockpit in which the user is located is open such that the user of the vehicle is protected via a roll bar which extends upwardly from the vehicle body.

In one embodiment, one or both of the seat and roll bar are detachable from the body so as to be moveable between in-use positions in which the seat and body extend upwardly from the body and the user sits in the seat in a cavity in the body, and the storage position in which the bar is removed and/or a greater portion of the seat is located in the cavity. In one embodiment to move the seat to the storage position the same is detached and moved with respect to the cavity and then placed into the cavity. In one embodiment the backrest of the seat and the bar lie substantially inline and substantially flush with the top face of the body.

It is found that by providing the feature of allowing the seats and body to be moved between the storage and in-use positions, so the movement of the vehicles between locations of use is greatly improved in terms of requiring less storage space. This is particularly important when it is envisaged that the vehicles are use in a vending scenario in which the vehicle is taken to a particular event and then hired out.

In one embodiment, the vehicle includes a dashboard and control system.

In one embodiment, the control system allows the provision of any or any combination of a communication system such as RF, Wi-Fi, Bluetooth and/or location detection means such as GPRS in order to allow the location of the vehicle to be identified and/or allow communication between the vehicle and a remote control station or operator.

In one embodiment, the vehicles are provided to be used together as a group and a remote control system can be provided to allow the remote control of operation of at least some features of the vehicles, either independently or as a group such that, for example, if the group of the vehicles are being used at the same time and two of the same happen to crash to cause a hazard, the operator of the vehicles can use a remote control to stop operation of all or selected vehicles in the group until the hazard is removed and independently of any control input from the driver of the vehicle. Another example could be that if the vehicles are being operated for a predetermined period of time then when the time period has elapsed the operator can stop the operation of the vehicles by using the common remote control.

In one embodiment, the vehicles are provided to be used either independently or as part of a group in a gameplay scenario in which users can operate the vehicles and also possibly guns or other similar aiming devices in order to attempt to hit targets which may be other vehicles in a group of vehicles and/or may be fixed targets on a particular course or route for the vehicles to follow or may be an unmanned device. In one embodiment, lasers and ultrasonic aiming devices may be utilised and the vehicles and/or other targets include detectors in order to detect whether aiming devices successfully "hit" the same.

In one embodiment the control of each and/or the group of vehicles is achievable via a remote control by a controller of the group and independently from the drivers of the group.

In one embodiment the remote control is achieved via any suitable wireless communication system such as infra red, Bluetooth or RF.

In one embodiment the said vehicles in the group are rendered operational for a predetermined period of time. Typically there is interaction and/or cooperation between the vehicles in said group.

In one embodiment the interaction and/or cooperation occurs on a live, real time basis.

In one embodiment the vehicle includes a battery management system in which the current of the power supply from the one or more batteries is monitored and, if the same is detected as being above a predetermined level the motor of the vehicle is switched off for a predetermined period of time.

Typically after the predetermined period of time power is again supplied to the motor and the current level is then monitored once again and if the current has reduced below the predetermined level the normal operation of the vehicle is resumed.

In one embodiment, the unmanned device includes a control system which allows the same to detect the location of one or more vehicles and then, depending on the control settings for the device at that time, the device may try to follow a particular vehicle or, alternatively, may try to evade the vehicle depending on the particular gameplay mode at that time. In one embodiment the vehicles can be provided to operate indifferent modes, depending upon the gameplay and/or condition of the vehicle and/or the site conditions at that time.

In another embodiment, the unmanned device may be an unmanned flight vehicle such as a drone which is provided to fly amongst the vehicles, as part of gameplay and/or in addition, to capture video and/or audio from the vehicles during operation.

In one embodiment, the vehicles are provided to operate along a track which is predefined or alternatively within a predefined area in a random manner and if the vehicles are attempted to be moved outside of the predefined area, the control means render the same inoperable. Furthermore, if the vehicle is brought into contact with an obstacle and is still powered, detection means provided on the vehicle will then automatically shut off the power so as to avoid the continued operation and potential damage to the vehicle.

In one embodiment, the vehicle includes sensing means to detect the presence of other vehicles or objects and, if the movement of the vehicle is in the direction towards another vehicle or an object within a predefined range of the same, the power to the vehicle is reduced and continues to be reduced if the vehicle continues in the path towards the detected other vehicle or object and continues until eventually no power is supplied and thereby avoids or at least minimises any impact with the said other object or vehicle.

In another embodiment wire in the ground technology can be used to define an area of use and/or direction of travel and/or avoid obstacles on a track.

In one embodiment, the drive system utilises a worm gear so that when power is removed from the vehicle, the vehicle is retained in that position and therefore prevents the vehicle from rolling backwards or forwards in an uncontrolled manner which could possibly be the case if, for example, the vehicle happened to be located on a relatively steep slope at the time in which the power was removed.

In one embodiment the vehicle includes one or more light sources on the external surface of the same such as, in one embodiment, LED lighting means can be provided on the front; side; and/or rear panels of the chassis.

In one embodiment these light sources are used to automatically come on when the light in the surrounding environment is insufficient, thereby allowing the lights to be used as guidance and/or warning means and allow the vehicles to be used at night;

In one embodiment the one or more light sources can be used as an interface with a gameplay mode so that they flash on and off and with different colours in certain circumstances (i.e. when hit by a laser; or when in defence mode).

Figure 4A:
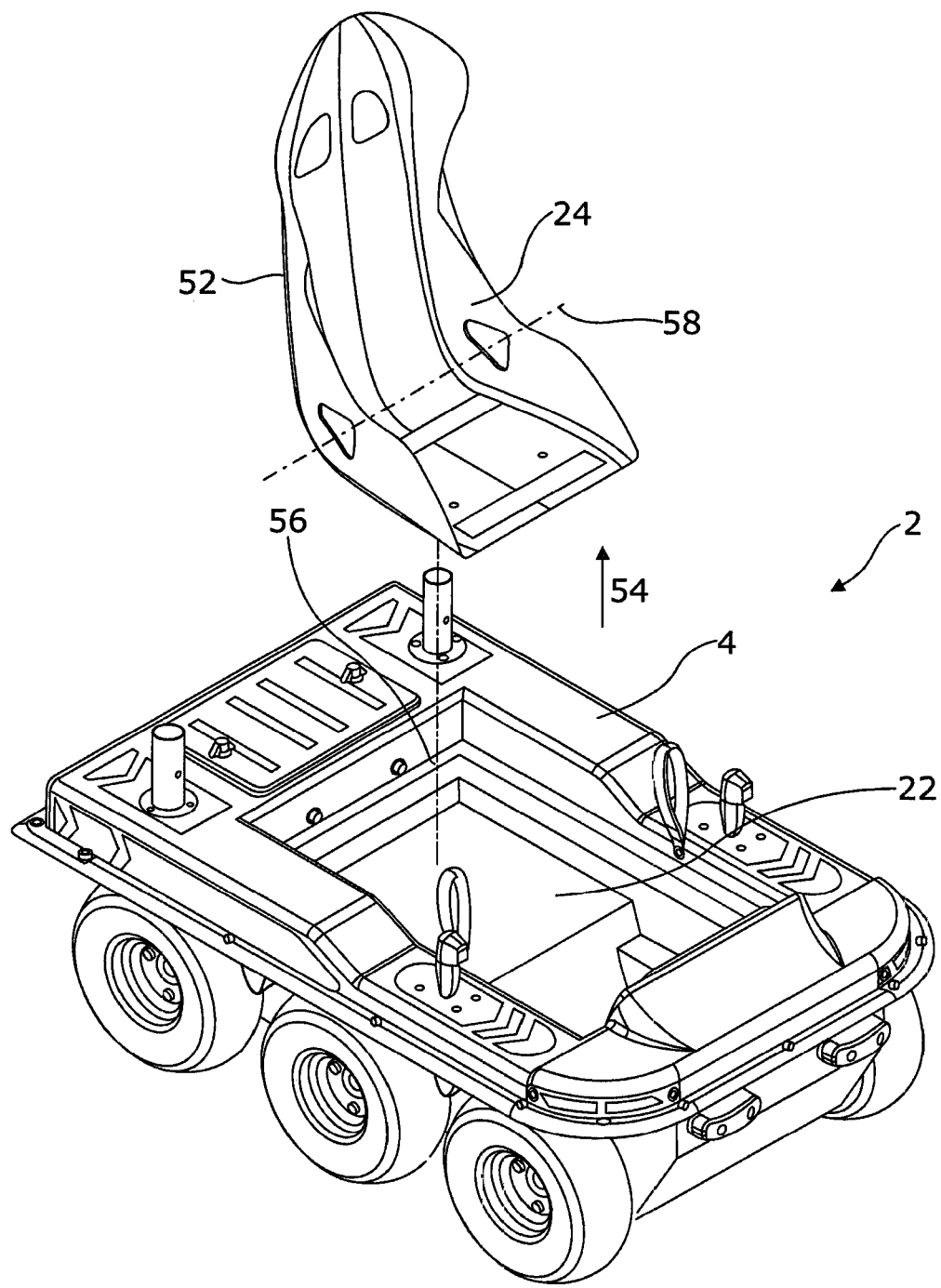
Figure 4B:
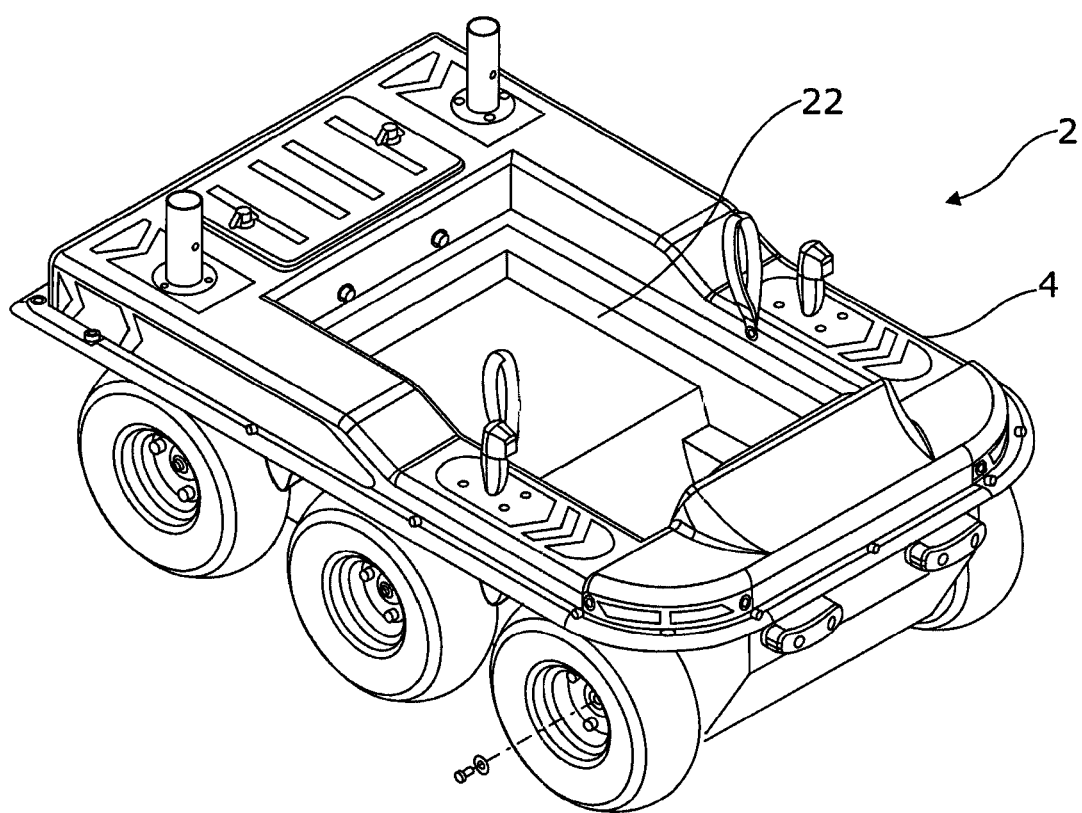
Figure 4C:
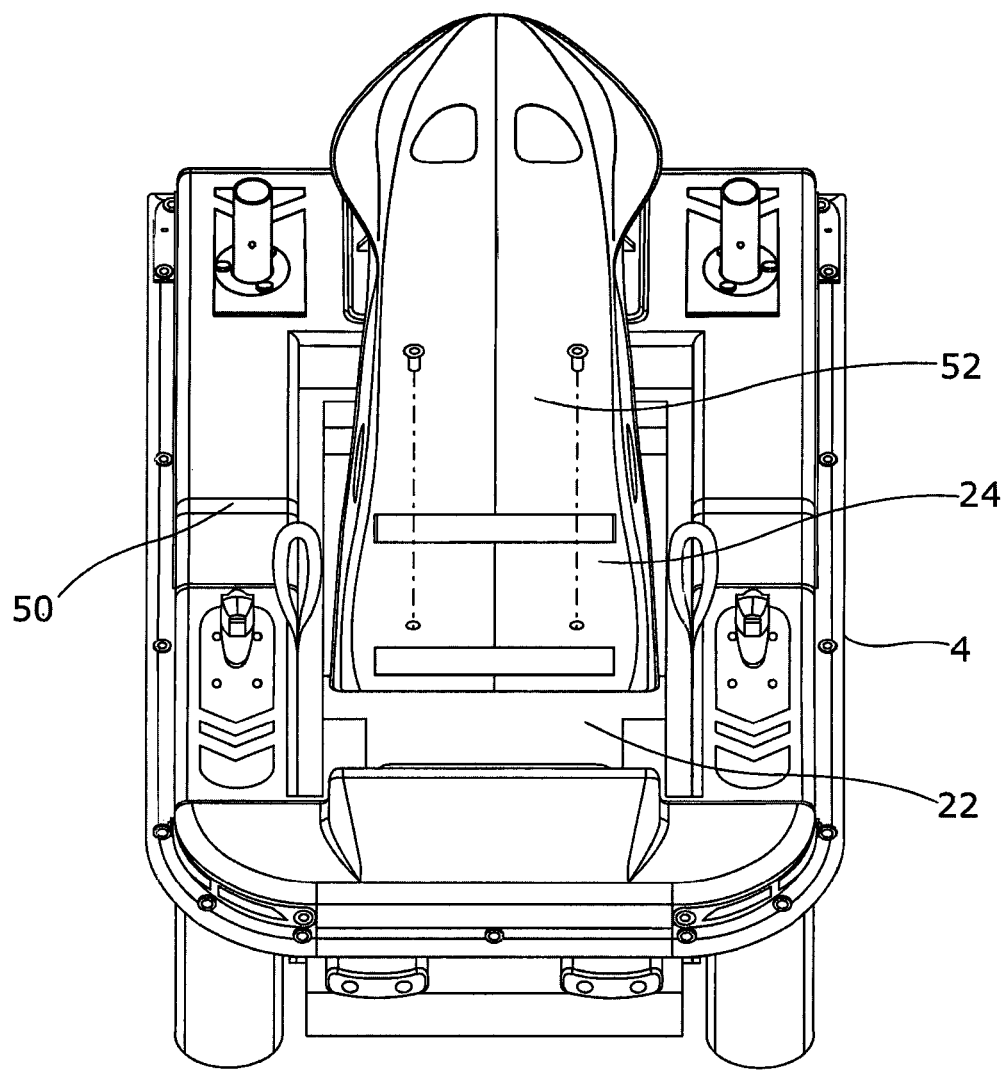
Figure 5A:
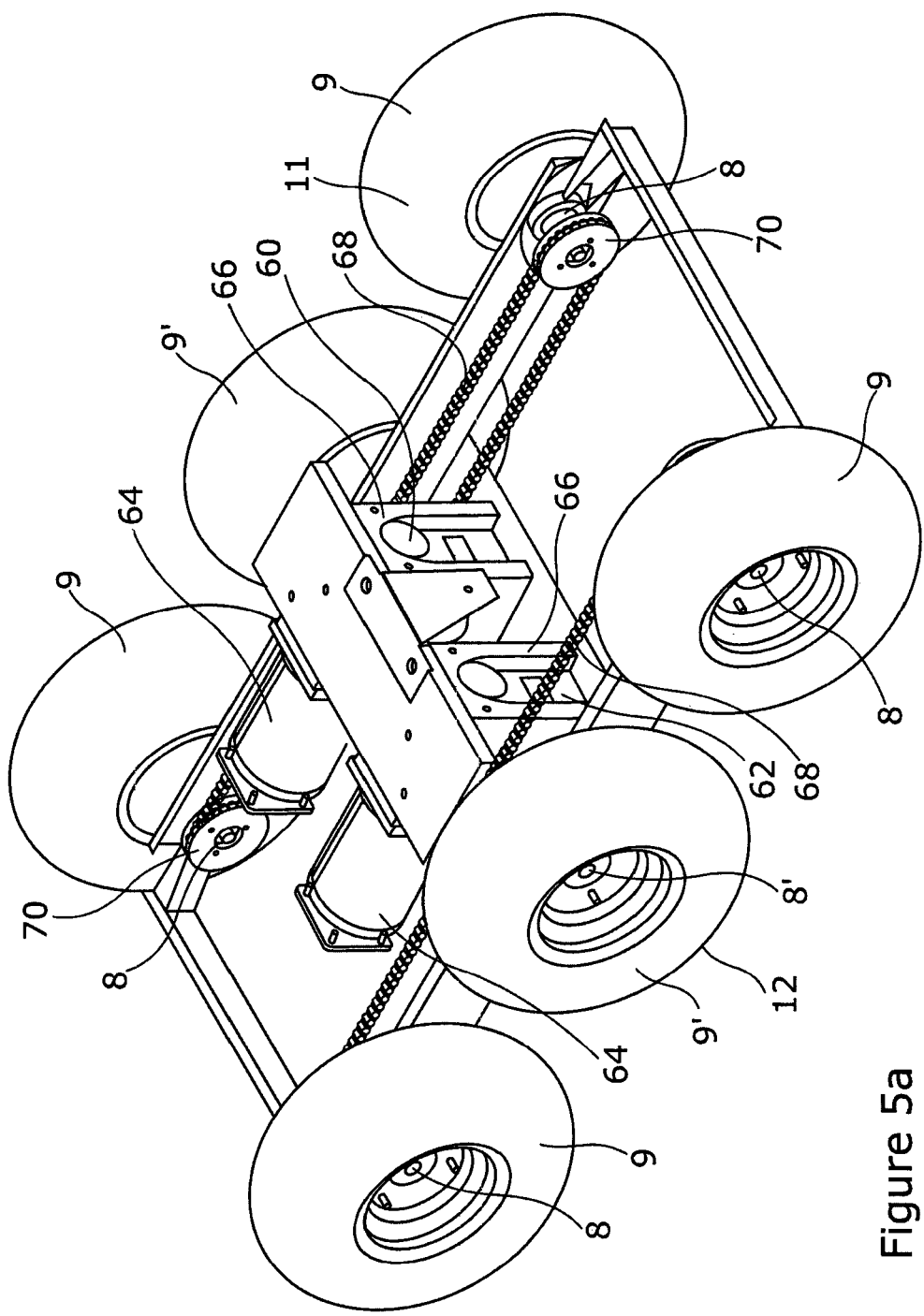
Figure 5B:
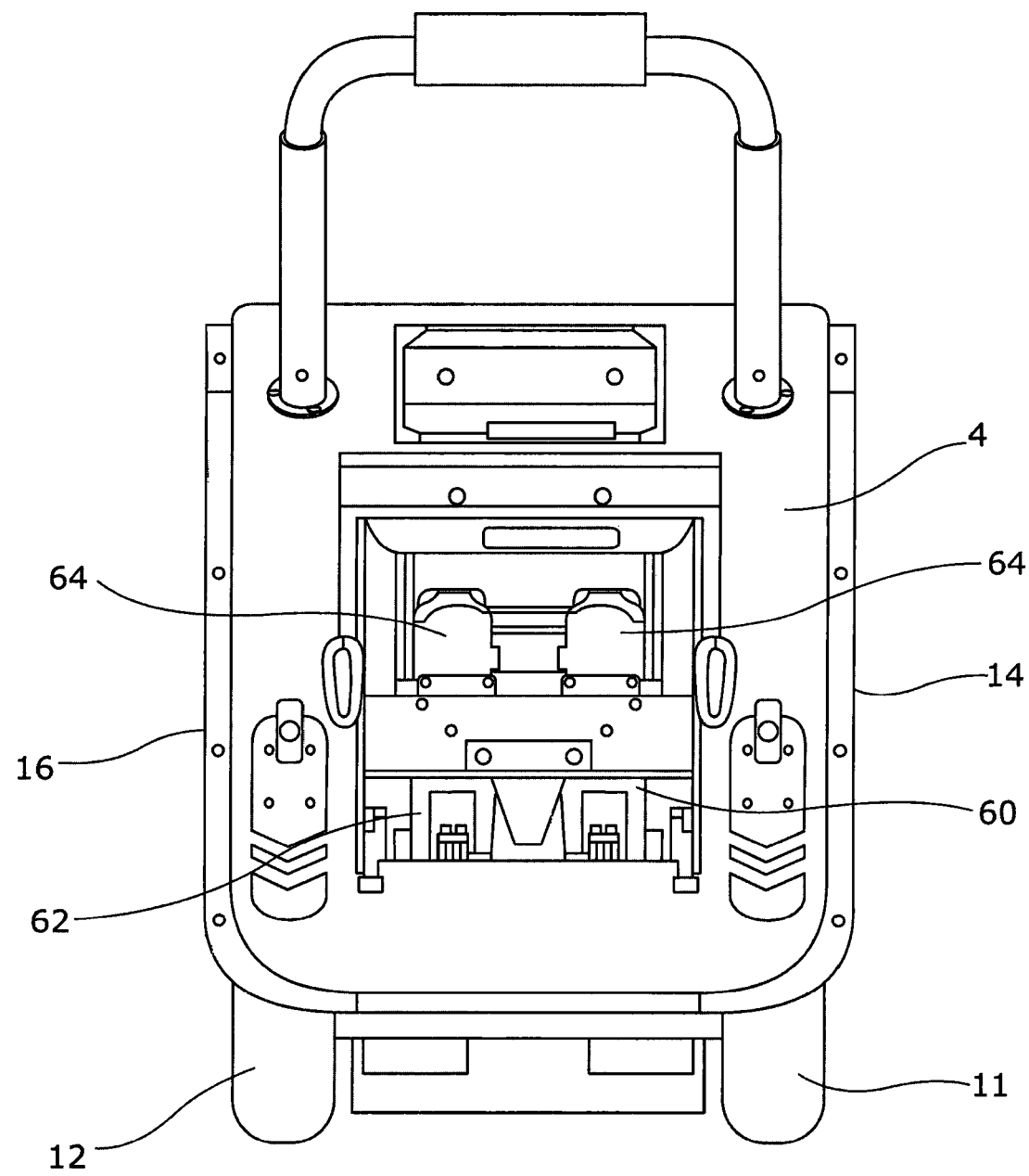
Figure 5C:
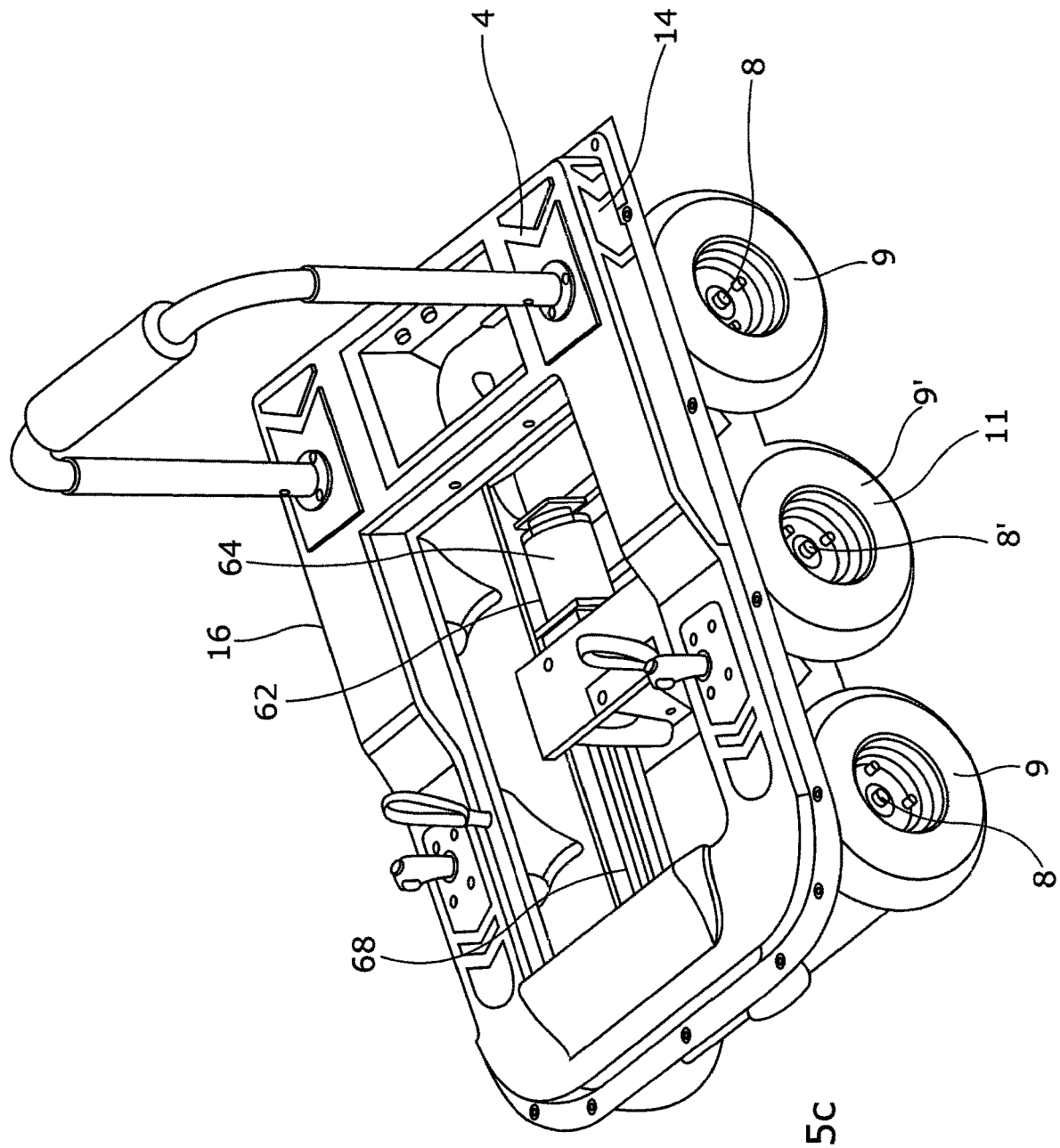

Specific embodiments of the invention are now described in which;

FIGS. 1a-d illustrate views of a vehicle in accordance with one embodiment of the invention;

FIGS. 2a and b illustrate schematically plan views of the apparatus in accordance with the invention;

FIGS. 3a-d illustrate further views of the vehicle in accordance with a further embodiment of the invention;

FIGS. 4a-c illustrate the manner in which the vehicle of FIGS. 3a-d can be moved between storage and in use conditions; and FIGS. 5a-c illustrate a drive system for the vehicle in accordance with one embodiment of the invention.

Referring firstly to FIGS. 1a-d and 3a-d there are provided various views of two embodiments of a vehicle 2 in accordance with the invention and the same reference numerals are used for the same features in each embodiment. The vehicle includes a body 4 to which are mounted a series of axles 8 on which are provided wheels 9 with tyres 10. The wheels are arranged into two sets, 11, 12, a first set provided on the first side 14 of the body and the second set 12 provided on the opposing side 16 of the body 2.

In each set of wheels, (in this embodiment there are provided three wheels but this need not always be the case) in accordance with the invention, one of the wheel axles, the centre wheel axle 8' is offset to the axles 8 of the other two wheels of the set and, more specifically, it is offset in a perpendicular direction to the surface 18 along which the vehicle travels so that the axle 8' is closer to the surface 18 than the axles 8 of the remainder of the wheels in each set. In this way, while all wheels are capable of contact with the surface 18, the centre wheel axle 8' is in greater contact in terms of surface area and/or pressure with the surface the majority of the time, whilst taking into account undulations in the surface 18 so that this wheel has the greater grip and/or traction on the surface 18 than the other wheels in the set.

It should be appreciated that this effect can be enhanced or alternatively achieved, by the selective inflation pressures of the tyres of the wheels in the set so that for example the pressure of the tyre of the centre wheel is greater than the pressure of the tyres of the other wheels in the set and this may, be an alternative manner to achieve greater grip and/or traction of that wheel without offsetting the axle of that wheel from the other wheels in the set of wheels.

The provision of the said wheel which has the greater traction and/or grip in the set of wheels allows that wheel 9' to act as the pivot wheel as will be described subsequently.

Typically, the body includes a cockpit 22 in which there is located a seat 24 for the user to sit in and on which is mounted a roll bar 26 which is formed so as to raise above and protect the normal head position of the user when sitting in the vehicle 2. In one embodiment the type and/or size of seat which is provided can be selected to determine whether the vehicles is to be used by an adult or child.

Also located on the body, in this embodiment are first and second joysticks 30, 32, and a dashboard. The dashboard 34 can provide conventional driving information such as speed, available power, indicators, light, horn and the like. It may also include a display for other indicators to allow the condition of operation of the vehicle to be indicated such as for example, if the vehicle is to be provided as an all terrain vehicle, there may be an indicator of the slope or incline in which the vehicle is positioned at that time and/or if the vehicle is to be used in gameplay, then there may be further indicators to indicate the particular condition of the gameplay, perhaps the position of the player in the overall game, the condition of the vehicle in terms of available ability to participate in the game and/or the position of the vehicle with respect to the detected position of other vehicles in a group of the vehicles.

In a further embodiment, the display 34 may be provided on the vehicle and/or part of a device for the person such as a helmet. In one embodiment the display may indicate a particular mode of operation which is available for the vehicle at that time or for a predesignated period of time in the future such as for example, the vehicle may be operable in a boost mode in which more power is available for a predetermined time so as to give the player an advantage in playing the game using the vehicle for that time.

The vehicle can be steered using the first and second joysticks 30, 32 which are positioned so as to be useable when gripped, by the users left and right-hand respectively. The joysticks also typically include a Deadman's handle switch system which means that both the switches 36, 38, need to be depressed by the user's hand simultaneously before it is possible for the power to be supplied to the wheels and hence before it is possible for the vehicle is to be moved. If both or one of the switches, is then returned to an out of use position by removal of the finger from the switch or hand from the joystick which could be intentional or unintentional such as, for example, if there was a crash situation, the power to the vehicle will automatically be stopped.

Although this embodiment of the vehicles includes two joysticks it is possible that one joystick may be provided or other steering user interaction means could be used such as levers, steering wheel or the like to the same effect.

Thus, in order to steer, the user can selectively move each of the joysticks 30, 32 independently and, while this will typically still mean that power is supplied to both sets of wheels, if the user wishes to steer the vehicle to the right or left, there will be provided a differential in the drive force supplied to the wheels. Thus, for a slight steer to the right or the left, then one set of wheels may be moved at a greater speed than the other set of wheels in the same direction while for a more abrupt steer or bend, one set of wheels may be moved in the first direction and the second set of wheels may be moved in the opposite direction.

In any case, due to the greater grip and/or traction of the centre wheel axle 8' in each set of wheels then the movement to the right or left is about a pivot axis which is located at the centre of the vehicle. Thus, as shown in FIG. 2a, when it is desired for the vehicle to turn to the right, the pivot of rotation 38 is generated by the operation of the control means, in this embodiment in the form of the two joysticks, so that a forward power force 42 is applied to the left-hand set of wheels 11 and a reverse drive force 44 is applied to the second set of wheels 12 so that there is a powered steer achieved as indicated by the arrow 56.

In FIG. 2b, when it is desired that the vehicle is to be steered to the left 46, the pivot axis 38 is again about the centre of the vehicle and the different drive forces are applied in opposite directions to those in FIG. 2a so that the vehicle 2 is steered in the direction of the arrow 46 as indicated.

It will be appreciated that this is a different form of steering from that used in other all terrain vehicles which typically operate a skid steer system which requires significant power and which would quickly drain the batteries used to provide power for the current vehicle.

Typically, the body 4 will include storage space therein for one or more batteries (not shown) so as to provide the electrical power to the drive means to allow the vehicle to be moved. It is imperative that the lifespan for the operation of the vehicles between battery charges to be long enough so as to be effective and therefore to allow the vehicle to be practically usable for commercial purposes such as the hiring of the same for periods of time of use to individuals or groups, such as children. This is achieved in the current invention by providing a relatively lightweight vehicle body and importantly the provision of the steering system which allows the steering of the vehicle to be achieved with a relatively low power requirement and this sis achieved by the provision of the offset arrangement of at least one wheel in each set of wheels which allows the steering to be achieved without significantly draining available power from the batteries of the vehicle. As such it is found that the available capacity of power from the batteries is sufficient to allow the vehicle to be used for practical purposes. A vehicle battery management system will typically be provided in which the current of the power supply from the one or more batteries is monitored during use of the vehicle and if the current is detected as being above a predetermined level the motors of the vehicle are switched off for a predetermined period of time and after the predetermined period of time power is again supplied to the motor and the current level is then monitored once again and if the current has reduced below the predetermined level the normal operation of the vehicle is resumed.

Typically the vehicle will include one or more sensing means 72 as shown as an example in FIG. 3a, to detect the presence of other vehicles or objects and, if the movement of the vehicle is such that the presence of another vehicle or object is detected as being too close within a predefined range 74 the power to the vehicle is stopped or more typically reduced and continues to be reduced if the vehicle continues in the path towards the detected other vehicle or object and continues until eventually no power is supplied and thereby avoids or at least minimises any impact with the said other object or vehicle.

In another embodiment wire in the ground technology can be used to define an area of use and/or direction of travel and/or avoid obstacles on a track.

In a further embodiment the location of the vehicle can be determined using, for example, GPRS technology and if the area in which the vehicle is confirmed to travel is mapped and/or locations of other vehicles is known then the location of the vehicle with respect to obstacles and/or other vehicles in the area can be determined and if the same are detected as being too close the control of the vehicle can be remotely controlled and the control inputs from the driver of the vehicle over-ridden so that the operation of the vehicle and/or other vehicles are remotely controlled such as for example to cause deceleration and thereby avoid or minimise the opportunity for collision to occur.

Typically the vehicles in a group of vehicles are provided with a communication system which allows the wireless communication between the vehicles directly rather than via a centralised controlling unit so as to allow game play or other functions to be available directly between the users of the vehicles.

The use of all terrain vehicles allows them to be used in relatively undulating surface and environments and in accordance with one embodiment of the invention the vehicle includes an anti-tilt system which ensures that the vehicle is prevented from reaching an angle of tilt which may cause the same to topple over in an uncontrolled manner. The centre of gravity of the vehicle will be affected by the size of the person driving the vehicle at a given time and therefore in one embodiment the vehicle includes the facility for the size of the driver to be input or assessed prior to commencing operation and the anti tilt system can take this information into account when assessing the appropriate angle at which an alarm or prevention of movement of the vehicle is activated by the anti tilt system. In one embodiment the said predefined angle may be 30 degrees from horizontal. The anti tilt system may include an accelerometer, gyroscope and/or magnetometer with 360 degree axes of detection and typically with 9 degrees of freedom.

In which ever form, in one embodiment, once the predefined angle is detected, the movement of the vehicle in the current direction is stopped automatically by the control system for the vehicle. In one embodiment the vehicle then enters a recovery mode in which the movement of the vehicle is started in the opposite direction or in another direction determined with reference to the angle of approach to the vehicle's current position so as to move the vehicle to a position at which the angle of tilt is removed and thereafter normal operation of the vehicle can be recommenced.

There will typically be a need to transport the vehicle 2 either at the time of manufacture and transport to the retailer or customer, or, thereafter, to allow the vehicles to be transported to different locations of use which may be relatively frequently required if the vehicle is to be hired out for use at different locations. In accordance with the invention in one embodiment and as illustrated in FIGS. 4a-c, the vehicle can be moved between the in use-condition shown in FIGS. 3a-d to a storage position by following steps shown in FIGS. 4a-c in which the roll bar 26 is removed from the body 4 as shown in FIG. 4a and for the seat 24 to be disengaged from the body 4 and then moved out of the cockpit 22 as indicated by arrow 54 to leave the cockpit 22 empty as shown in FIG. 4b. The roll bar may then be stored separately or can be positioned with regard to the body such that the roll bar 26 lies substantially flush with the top surface 50 of the body. The seat 24 is then pivoted 180 degrees around the axis 56 and turned through 90 degrees about axis 58 so that the seat can then be positioned in the cockpit 22 such that the backrest 52 of the seat 24 is substantially flush with the top surface 50 of the body as shown in FIG. 4c and thus it will be appreciated that the overall height of the vehicle is significantly reduced for storage conditions and can relatively easily be moved to the in-use condition as and when required by reversing the steps described above.

As shown in FIGS. 5a-c each of the sets of wheels 11,12 is provided with an independent drive system 60, 62 respectively, each including an electrically powered direct drive motor 64 and a worm gear assembly 66 connected to drive a chain 68. Each chain is connected to sprocket wheels 70 which are provided on the axles 8,8' for the wheels 9, 9' in each set so that each wheel in each set is driven by the same drive system, with one drive system on each side. In one embodiment tensioning means (not shown) may be provided for the chain 68 so as to ensure that the chain connection with the gear assembly and/or sprocket wheels 70 is maintained during use of the vehicle in order to ensure effective transfer of power between the components.

This provides the ability for an advanced powered steering system to be provided which allows a smaller turning circle to be achieved for the vehicle whilst reducing power/fuel consumption by up to 75% during turning/steering operation in comparison to conventional steering systems and which, in turn, allows the provision of an effective electric powered vehicle to be provided which has a practical life of use between battery charging which is of paramount importance.

What is claimed is:

1. A vehicle for use for movement across a surface, said vehicle including a body, a steering means to allow selective steering of the vehicle and first and second sets of a plurality of drive wheels, a first set mounted on one side of the body and a second set mounted on an opposing side of the body so as to contact with the surface and at least one wheel in each set of drive wheels is provided so as to be in greater traction and/or grip with the said surface than the other wheels in the set of drive wheels, said steering means controlled by a user operation of a first joystick operable to control the movement of the first set of drive wheels and a second joystick operable to control the movement of the second set of drive wheels wherein the vehicle is provided with a safety system operable in conjunction with the first and second joysticks, with each joystick having a switch which is operable by the user in order to allow the operation of the vehicle to be achieved and the switches of the first and second joysticks are required to be operated simultaneously to allow powered movement of the vehicle.

2. A vehicle according to claim 1 wherein an axis of rotation of said at least one wheel with the greater traction and/or grip is offset to axes of rotation of the other wheels in the set of wheels such that the axis of rotation of said at least one wheel is closer to the surface than the axes of rotation of the other wheels in the said set.

3. A vehicle according to claim 2 wherein each set of drive wheels includes three wheels and the offset wheel is a central wheel of the set of drive wheels.

4. A vehicle according to claim 1 wherein during use all of the wheels will contact with the surface.

5. A vehicle according to claim 1 wherein ties which are provided on the wheels are all inflated to a pressure within a predetermined range and the at least one wheel in each set of drive wheels which has the greater contact and/or grip on the surface has a higher pressure of inflation of tire than the tires of the other wheels in the set of drive wheels.

6. A vehicle according to claim 1 wherein the steering of the vehicle to the right or left is achieved by operation of one of the sets of drive wheels to move in a forward direction and the operation of the other set of drive wheels to move at a reduced speed in the forward direction, or in the reverse direction so that an axis of rotation of the vehicle during a steering movement is effectively about a location of a center of the vehicle.

7. A vehicle according to claim 1 wherein the drive to a drive set of wheels is provided via a chain which locates with sprocket wheels provided in engagement with each of the wheels in the set of drive wheels.

8. A vehicle according to claim 7 wherein in order to allow the control of the chain with respect to the sprockets, each of the sprockets is provided with guide means in the form of a plate mounted on either side of the sprocket so as to restrict movement of the chain to either side of the sprocket.

9. A vehicle according to claim 1 wherein the vehicle is a single seated vehicle.

10. A vehicle according to claim 1 wherein one or both of a seat and/or roll bar are detachable from the body so as to be moveable between in-use positions in which the seat and roll bar extend upwardly from the body and the user sits in a cavity in the body, and a storage position in which the seat and/or bar is removed and/or an increased portion of the seat is located in the cavity.

11. A vehicle according to claim 1 wherein the vehicle includes a dashboard and control system and/or display screen to allow the provision of any or any combination of Wi-Fi, Bluetooth and/or GPRS in order to allow a location of the vehicle to be identified and/or allow communication between the vehicle and a remote control station or operator.

12. A vehicle according to claim 1 wherein the apparatus includes a tilt sensor system to detect when the vehicle reaches a predetermined angle of tilt and, if detected, an operating condition of the vehicle is altered.

13. A vehicle according to claim 12 wherein the operating condition change is for movement of the vehicle in a direction of travel to be stopped and movement of the vehicle is only possible in a substantially reverse direction until a detected angle of tilt is below the predetermined angle of tilt.

14. A vehicle according to claim 1 wherein a plurality of vehicles are provided to be used together as a group and a control system is provided to allow the control of operation of at least some features of the vehicles in the group either independently or as a group.

15. A vehicle according to claim 14 wherein the said vehicles in the group are rendered operational for a predetermined period of time.

16. A vehicle according to claim 14 wherein the said vehicles in the group are controlled to operate in a gameplay scenario in which users can operate the vehicles and there is interaction and/or cooperation between the vehicles in said group.

17. A vehicle according to claim 1 wherein the vehicle includes a battery management system in which the current of the power supply from the one or more batteries is monitored and, if the same is detected as being above a predetermined level a motor of the vehicle is switched off for a predetermined period of time.

18. A vehicle according to claim 1 wherein the apparatus includes other components for use by the user to attempt to hit targets which may be other vehicles in a group of vehicles and/or may be fixed targets on a particular course or route for the vehicles to follow.

19. A vehicle according to claim 1 wherein if the vehicle is brought into contact with an obstacle, detection means provided on the vehicle automatically shut off a power supply to a drive system so as to avoid continued operation and potential damage to the vehicle.

20. A vehicle according to claim 1 wherein the vehicle includes sensing means to detect the presence of other vehicles or objects and, if the movement of the vehicle is in a direction towards another vehicle or an object within a predefined range of the same, power to the vehicle is reduced and/or stopped.

21. A vehicle according to claim 1 wherein the drive system utilises a worm gear so that when power is removed from a drive means of the vehicle, the vehicle is retained in that position to prevent the vehicle from moving in an uncontrolled manner.

\* \* \* \* \*